(12) United States Patent
Sudbrink et al.

(10) Patent No.: US 9,474,199 B2
(45) Date of Patent: Oct. 25, 2016

(54) CASTERING WHEEL LOCKING FOR IMPLEMENT LIFT SYSTEM

(71) Applicant: CNH Industrial America LLC, New Holland, PA (US)

(72) Inventors: Matthew R. Sudbrink, Metamora, IL (US); Dean A. Knobloch, Tucson, AZ (US); Daniel Scott Valandingham, Waterloo, IA (US)

(73) Assignee: CNH Industrial America LLC, New Holland, PA (US)

( * ) Notice: Subject to any disclaimer, the term of this patent is extended or adjusted under 35 U.S.C. 154(b) by 27 days.

(21) Appl. No.: 14/560,021

(22) Filed: Dec. 4, 2014

(65) Prior Publication Data

US 2015/0156947 A1    Jun. 11, 2015

Related U.S. Application Data

(60) Provisional application No. 61/914,652, filed on Dec. 11, 2013.

(51) Int. Cl.
*A01B 63/22* (2006.01)
*A01B 73/04* (2006.01)
*A01B 73/06* (2006.01)

(52) U.S. Cl.
CPC ............ *A01B 63/22* (2013.01); *A01B 73/048* (2013.01); *A01B 73/065* (2013.01)

(58) Field of Classification Search
CPC .... A01B 63/16; A01B 63/22; A01B 73/048; A01B 73/065; A01B 73/067; A01B 73/06
USPC ................................................ 172/311, 386
See application file for complete search history.

(56) References Cited

U.S. PATENT DOCUMENTS

| | | | |
|---|---|---|---|
| 3,700,041 A | 10/1972 | Ryan | |
| 4,026,365 A | 5/1977 | Andersson et al. | |
| 4,119,156 A * | 10/1978 | Wheeler | A01B 63/22 172/386 |
| 4,119,329 A | 10/1978 | Smith | |
| 4,317,489 A | 3/1982 | Steinbach | |
| 4,359,105 A | 11/1982 | Van Natta | |
| 4,944,355 A | 7/1990 | Karchewski | |
| 5,562,167 A | 10/1996 | Honey | |
| 5,660,237 A | 8/1997 | Boyko et al. | |
| 5,829,370 A * | 11/1998 | Bender | A01B 73/067 111/120 |
| 6,076,613 A * | 6/2000 | Frasier | A01B 73/065 111/57 |
| 6,089,327 A | 7/2000 | Kimura et al. | |
| 6,112,827 A | 9/2000 | Reiber et al. | |
| 6,305,478 B1 | 10/2001 | Friggstad | |
| 6,367,589 B1 | 4/2002 | Lausch et al. | |
| 6,374,921 B1 | 4/2002 | Friggstad | |
| 6,860,335 B2 * | 3/2005 | Arnett | A01B 73/065 111/57 |

(Continued)

*Primary Examiner* — John G Weiss
(74) *Attorney, Agent, or Firm* — Rebecca L. Henkel

(57) ABSTRACT

A lift support system for a wheel assembly that provides variable support for the wing frame section of a tillage implement above the soil. The lift support system includes a vertically oriented tube slidably connected to the wing frame section for movement along a vertical axis. A wheel axle assembly is pivotally connected to the lower end of the tube and provides a support for the axle assembly. Wheels are journaled on the axle assemblies. A locking assembly selectively locks the wheel assembly in place when the tube is in a position for field transport and field operation with the locking mechanism being disengageable when the wing section is in a transport position to permit castoring of the wheel assemblies.

16 Claims, 5 Drawing Sheets

(56) References Cited

U.S. PATENT DOCUMENTS 7,854,272 B2 * 12/2010 Friggstad ............. A01B 73/065
  172/311
8,235,133 B2   8/2012 Friggstad
2012/0261146 A1   10/2012 Bolten
2014/0262376 A1 *  9/2014 Redekop ............. A01B 29/02
  172/286
2015/0107500 A1 *  4/2015 Audigie .............. A01B 73/044
  111/57

* cited by examiner

CASTERING WHEEL LOCKING FOR IMPLEMENT LIFT SYSTEM

CROSS REFERENCE TO RELATED APPLICATIONS

This is a non-provisional application based upon U.S. provisional patent application Ser. No. 61/914,652, entitled "CASTERING WHEEL LOCKING FOR IMPLEMENT LIFT SYSTEM", filed Dec. 11, 2013, which is incorporated herein by reference.

BACKGROUND OF THE INVENTION

1. Field of the Invention

The present invention relates to agricultural implements, and, more particularly, to lift systems for such implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

As tillage implements become wider and wider over time, it becomes more difficult to keep the transport size of the implement within manageable limits. It also becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

Tillage implements of this type have a plurality of wheels supporting the implement and fashioned to form a lift system which positions the implement at variable positions above the soil. When the implement is in the field, the lift system positions the implement either in a field transport position where any ground engaging tools are just above the soil and an operational position in which the tools penetrate the soil for tillage and other operations. When the implement is to be transported between fields, the lift system places the implement in a transport position in which the tools are well clear of the soil. The wheels that are part of the lift system must have several requirements. When the implement is in the field, it is extended to its full lateral position and in this position the wheels must be fixed to enable the laterally extending implement to track properly through the field. On the other hand, during the transport position in which some sections of the implement are folded, the wheels must be able to castor so that tracking down a road between fields is possible.

What is needed in the art therefore, is a simplified and effective system for locking the lift system wheels in the field and allowing them to castor during transport.

SUMMARY OF THE INVENTION

The present invention provides automatic locking and unlocking of castoring wheels for an agricultural implement.

The invention, in one form, is directed to a tillage implement having a main frame section including a pull hitch tube extending in a travel direction. At least one wing frame section is pivotally connected to the mainframe section between a field position in which the wing frame is transverse to the travel direction and a transport position in which the wing frame is parallel to the travel direction. Wheel assemblies are provided for variably positioning the main frame section above the soil and oriented to enable rolling movement in the travel direction. At least one wheel assembly is provided for variably positioning the wing frame section above the soil between a field operation position in which the wheel assembly is locked to permit movement only in the travel direction and a transport position in which the wheel assembly castors to support the winged section during transport.

The invention, in another form, is directed to a lift support system for a wheel assembly that provides variable support for the wing frame section of a tillage implement above the soil. The lift support system includes a vertically oriented support slidably connected to the wing frame section for movement along a vertical axis. A wheel axle assembly is pivotally connected to the lower end of the vertical support and provides a support for the axle assembly. Wheels are journaled on the axle assemblies. A locking assembly selectively locks the wheel assembly in place when the vertical support is in a position for field transport and field operation with the locking mechanism being disengageable when the wing section is in a transport position to permit castoring of the wheel assemblies.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplification is not to be construed as limiting the scope of the invention in any manner.

DETAILED DESCRIPTION OF THE INVENTION

Figure 1:
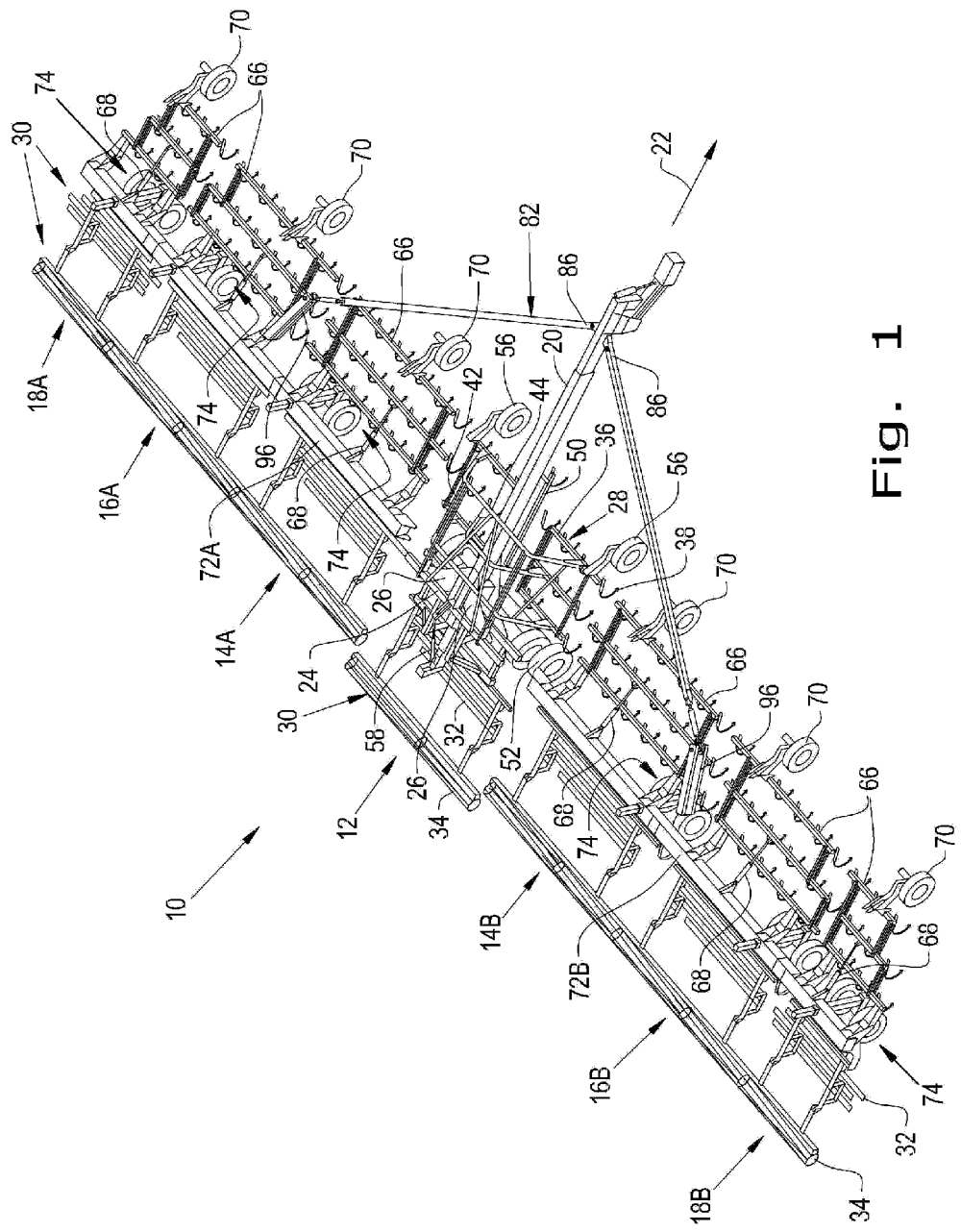
FIG. 1 is a top perspective view of an embodiment of an agricultural tillage implement of the present invention, in the form of a field cultivator in a field position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Figure 2:
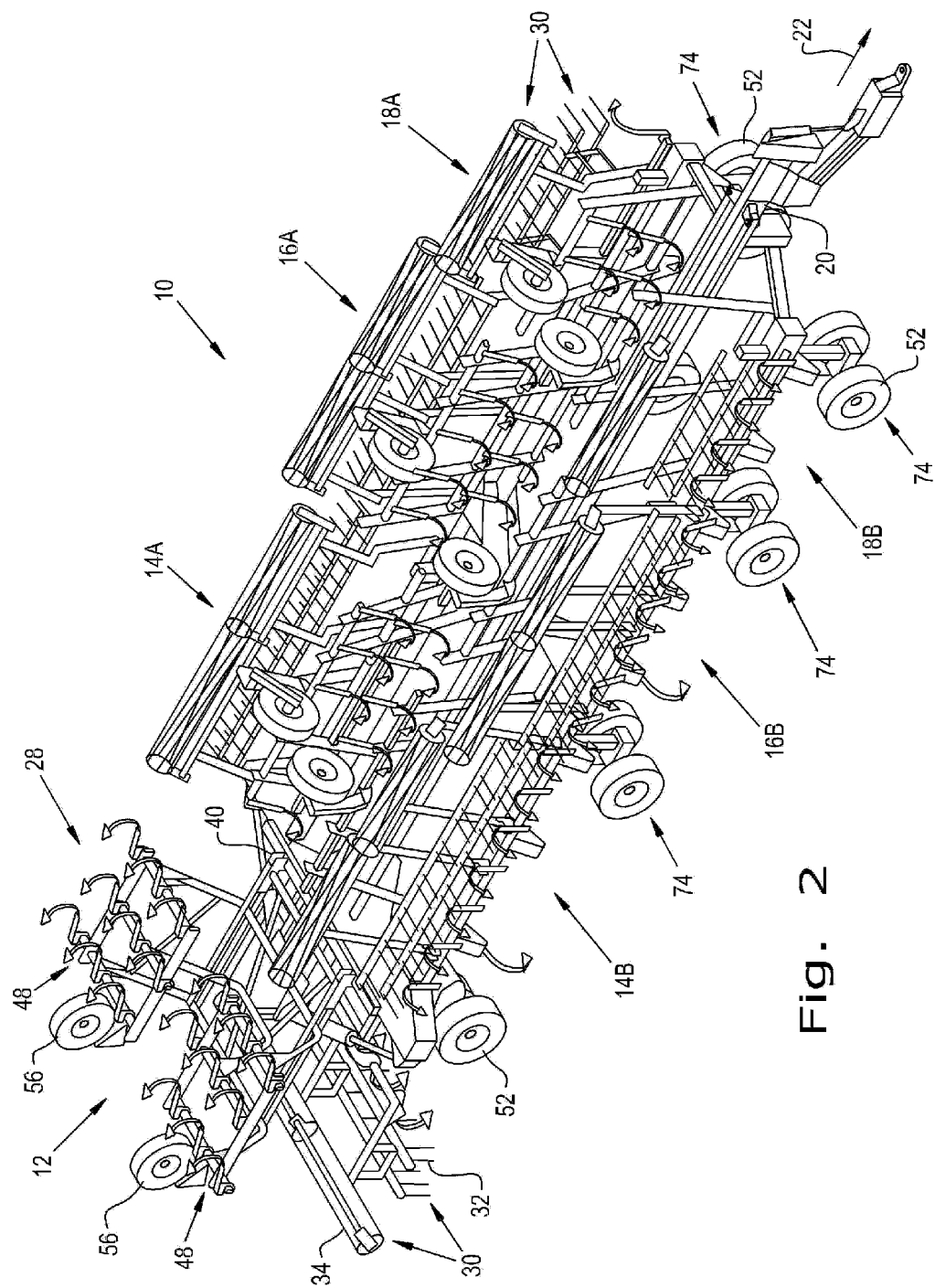
FIG. 2 is a top perspective view of an embodiment of the agricultural tillage implement of FIG. 1 in a transport position.
Figure 3:
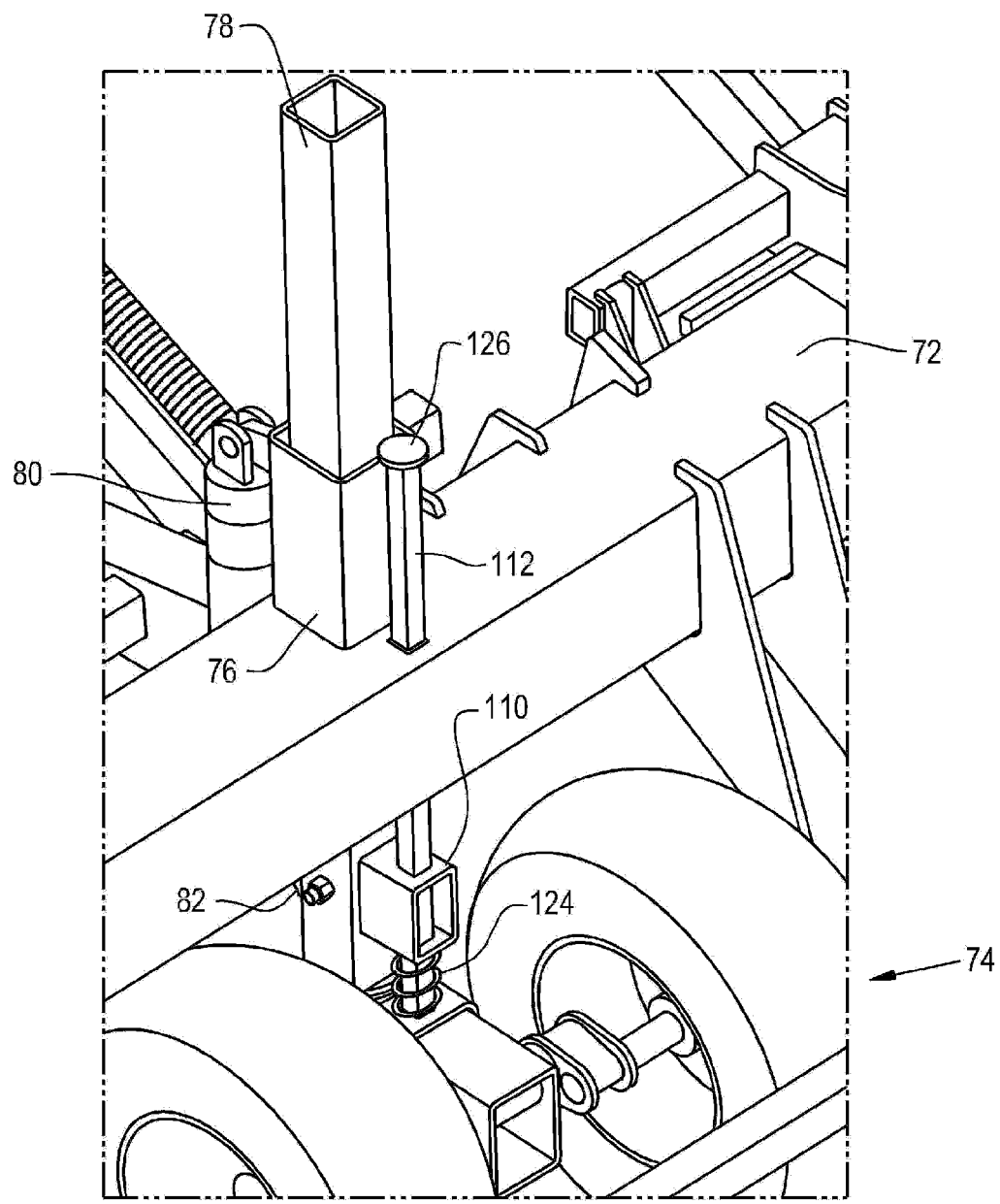
FIG. 3 is a detailed perspective view of the portion of a lift system for the tillage implement of FIGS. 1 and 2 shown in the locked field position.
Figure 4:
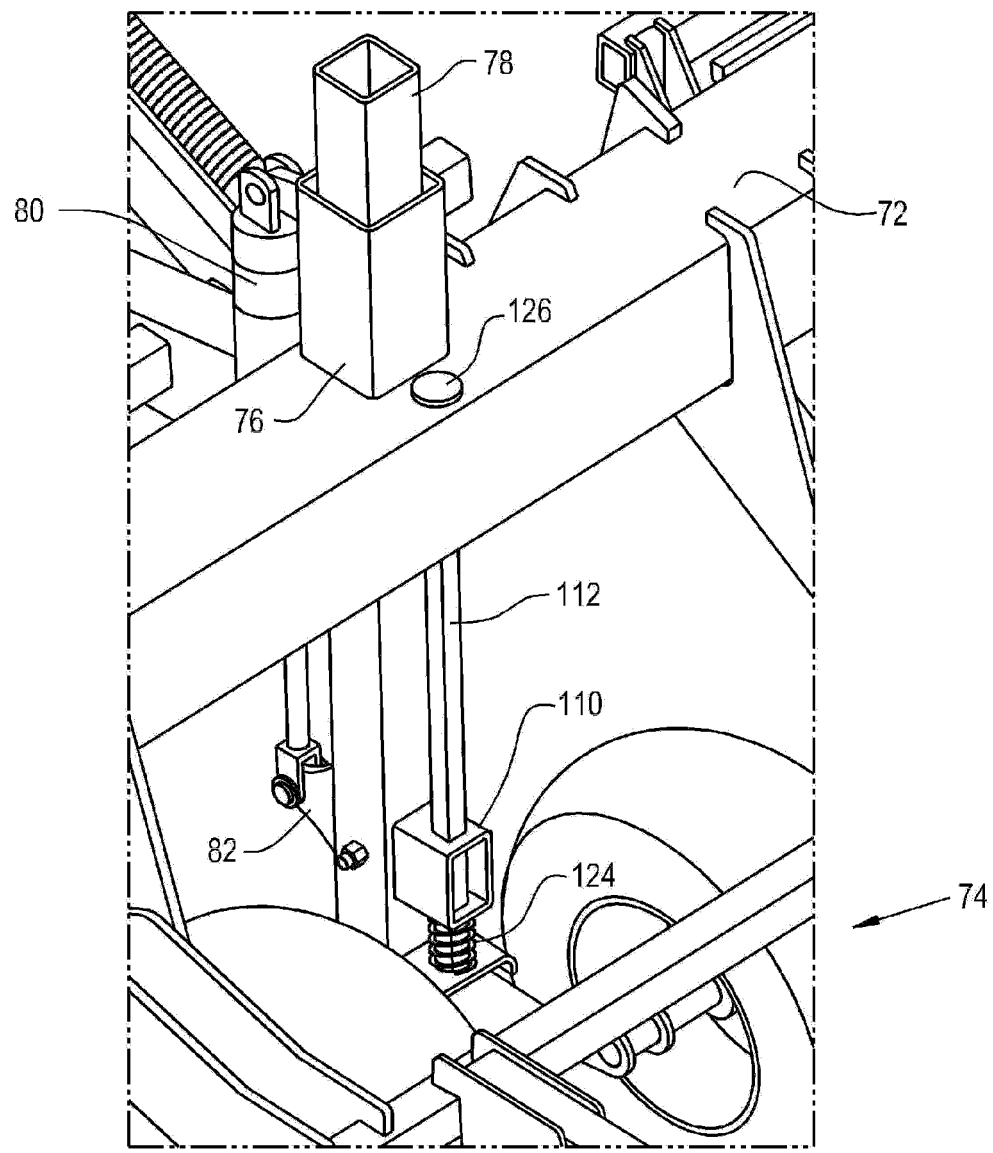
FIG. 4 is a perspective view of the lift system of FIG. 3, but in a transport position.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling (aka, crumbler) basket 34 which coact with each other to finish the soil. However, rear auxiliary implement can be differently configured, such as a spike tooth drag, cultivator shanks, etc. Shank frame 28 generally functions to carry cultivator shanks 36 with shovels 38 at their lower ends for tilling the soil. Shank frame 28 is pivotally coupled with tool bar 24, preferably at the top of tool bar 24, such as with couplings 40. Shank frame 28 is positioned in front of the tool bar 24 when in an operating position (FIGS. 1 and 3), and is foldable up and over the tool bar 24 to a position rearward of tool bar 24 when in a transport position (FIGS. 2 and 4). Shank frame 28 includes two sets of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to level shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may optionally be placed in a "float mode" such that gauge wheel assemblies 56 are operable to float up and down as they traverse across a field and thereby set the operating depth at the front edge of shank frame 28.

Wing sections 14A, 16A and 18A have a transversely extending tool bar 72A providing a major structural support for the winged sections. Wing sections 14B, 16B and 18B have a tool bar 72B forming a major structural support for those sections. Tool bars 72A and 72B are shown in FIG. 1 deployed in their field transport and operational position during which they extend laterally with respect to the travel direction 22. The various wing sections have wheel assemblies 74 interconnected with tool bars 72A and 72B for variably positioning the wing sections above the soil in synchronism with wheel assemblies 52. Wheel assemblies 74 have an elevation relative to the soil that is substantially identical to that for wheel assemblies 52. In the field transport and operation position shown in FIG. 1, wheel assemblies 74 track a direction parallel to travel direction 22. However, in the transport mode, illustrated in FIG. 2, the wheel assemblies 74 are required to castor so that they properly follow the direction of travel 22 but also provide support in that position for the wing sections.

Figure 5:
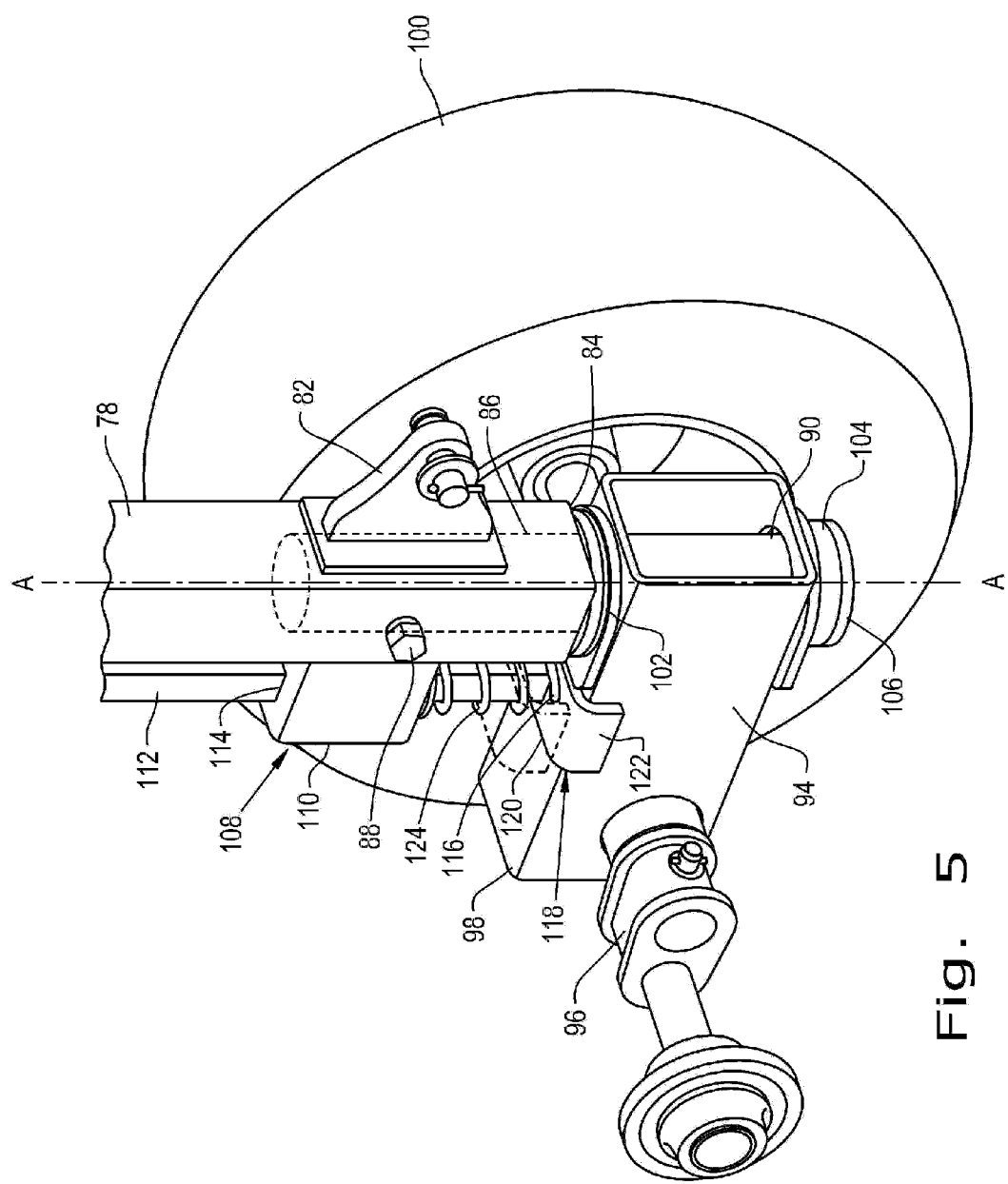
FIG. 5 is a detailed partial perspective view of the wheel assembly used and employed in FIGS. 3 and 4.

In accordance with the present invention, the wheel lift assemblies illustrated in FIGS. 3-5 provide a dual function of locking the wheels in position during the field transport and operation mode while permitting castoring in the transport mode. Referring specifically to FIG. 3, the tool bar 72 provides a support for the wheel assemblies 74. The individual wheel assemblies are identical so that only one need be described to provide an understanding of the invention. A square tube 76 is fixed through a hole in the toolbar 72 and oriented in a vertical direction relative to the soil over which the implement traverses. A square tube 78 forming a support for the wheel assembly 74 is telescoped through the interior of tube 76 and may be displaced in an upward and downward direction through the use of anti-friction pads (not shown). An actuator 80 is secured at one end to the tool bar 72 and at the other end to square tube 78 so that support tube 78 may be displaced upwards and downwards. The actuator 80 is secured to tube 78 at a tab 82 shown in FIG. 5. It should be apparent, however, that other forms of interconnection between the toolbar 72 and the support tube 78 may be employed to achieve the same function.

Referring specifically to FIG. 5, the support tube 78 has a bottom end 84 that receives a shaft 86 with a circular cross section. Shaft 86 is shown in dashed lines in FIG. 5 and is removably fixed in the lower end 84 of support tube 78 by an appropriate screw 88. Shaft 86 extends through a circular tube 90 fixed in square tube 94 extending generally at a right angle to shaft 86 and forming a support for walking tandem axle assemblies 96. Axle assemblies 96 are secured to the outer end 98 of tube 94 and journal wheels 100, only one of which is shown in FIG. 5.

A thrust washer 102 is sandwiched between the end 84 of tube 88 and the tubular support 94 to provide appropriate support for the tillage implement through the wheel assembly 74. The bottom of shaft 86 has a polyurethane disk 104 held in place by an end washer 106 through screws (not shown) to maintain a resilient damping force to prevent wobbling of the wheel assembly 74 during transport.

As shown, the wheel assemblies 74 are interconnected with the support tube 78 to permit rotation about a vertical axis. The connection for the axle assemblies 96 is positioned at a distance from the axis A so that when left unrestrained the wheels will trail behind the direction of travel.

In accordance with the present invention, the locking assembly 108 is provided to selectively lock or permit castoring depending upon the lift provided by the actuators 80. The locking mechanism 108 includes a square tube 110 fastened to support tube 78 by appropriate means such as welding. A bar 112 extends vertically through aligned square openings 114 in tube 110 for vertical movement in a direction parallel to the movement of support tube 78. The lower end 116 of bar 112 is secured to a U-shaped element 118 having a center section 120 and side legs 122 arranged to embrace the edges of tube 94 when in a lowered position. The legs 122 of element 118 are slightly tapered in an outward direction to facilitate engagement of the element 118 with tube 94. A spring 124 is telescoped over bar 112 and acts on the undersurface of tube 110 and the upper surface 120 of element 118 to urge it into engagement with tube 94. The element 118 will continue to be engaged with the tube 94 as the support tube 78 and bar 112 are translated in a vertical direction. As shown in FIGS. 5 and 3, the bar 112 continues to be engaged with tube 94 so that the wheel assemblies are locked in a position that restricts travel in a direction at right angles to the longitudinal axis of toolbar 72. The actuator 80 and control system (not shown) for the tillage implement have a range of positions that are utilized for in field use. They are field transport in which the wheel assemblies 74 are extended sufficiently so that the tools on the tillage implement are just above the soil. The actuator 80 also extends slightly less than this position at variable depths selected by an operator or control system to cause the tools to penetrate the soil. During these positions, the element 118 remains engaged with tube 94 to lock the wheels in place.

In the transport mode, shown in FIG. 4, the actuator extends the tube 78 to its maximum. A flange 126 on the upper end of bar 112 engages the top face of toolbar 72 to restrict further movement of bar 112 and associated element 118 in a downward direction. As fully shown in FIG. 4, the flange 126 lifts the element 118 off of tube 94 (see dashed lines in FIG. 5) to permit swiveling or castoring of the wheel assembly. This enables the wheel assemblies 74 to assume the position of FIG. 2 in which the tillage implement is transported along a road. In this position, the wheel assemblies 52 guide the tillage implement in the towed condition and the wheel assemblies 74 castor to follow the tracking while at the same time providing a lift function for the folded wing frame sections. The mechanism set forth enables a simple but highly effective and reliable interconnection between the wheel assemblies and their associated toolbar. It requires no additional control system and is dependent on the position set by the actuator, thus allowing locked configuration during a range of vertical motions and a fully castoring movement in other positions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tillage implement comprising:
    a main frame section including a pull hitch tube extending in a travel direction;
    at least one wing frame section pivotally connected to said mainframe section between a field position in which said wing frame is transverse to the travel direction and a transport position in which said wing frame is parallel to said travel direction;
    wheel assemblies for variably positioning said mainframe section above the soil and oriented to enable rolling movement in the travel direction; and
    at least one wheel assembly for variably positioning at least one wing frame section above the soil between a field position in which said wheel assembly is locked to permit movement only in the travel direction and a transport position in which said wheel assembly castors to support said at least one wing frame section, said wheel assembly including an axle for journaling at least one wheel, said axle assembly being pivotally connected to a vertically extending tube which is vertically displaceable relative to said at least one wing frame section;
    said tillage implement further comprising a bar having a U-shaped section and displaceable between a position in which the U-shaped section is free of said axle assembly for permitting castoring movement and a second position in which the U-shaped section embraces and prevents pivoting movement.

2. The tillage implement of claim 1, having at least a pair of wing sections.

3. The tillage implement of claim 1, having a plurality of wheel assemblies for said at least one winged section.

4. The tillage implement of claim 1, in which the wheel assemblies have three positions, one of which is a transport position, the second of which is a field transport position and the third of which is a field operation position.

5. The tillage implement of claim 1, in which the bar has a stop limiting displacement relative to the said at least one winged section frame to cause the U-shaped section to be free of the wheel axle assembly upon elevating the wing frame section to a transport position.

6. The tillage implement of claim 5, wherein said bar extends through and is displaceable vertically relative to said at least one wing frame section with said tubular element.

7. The tillage implement of claim 6, wherein the bar has a cap limiting the extent to which the bar extends from said at least one wing frame section.

8. The tillage implement of claim 7, further comprising a spring acting on the wing frame section and urging the bar in a direction to cause the U-shaped section to embrace the wheel axle assembly.

9. The tillage implement of claim 5, wherein the U-shaped section has flared side edges to assist engagement.

10. The tillage implement of claim 1, further comprising a hydraulic actuator connected between said wing frame and said wheel assembly.

11. A wheel support assembly providing a variable support for the wing frame section of a tillage implement, said wheel support comprising:
    a vertically oriented elongated support for slidable connection to said wing frame section for movement along a vertical axis between a field position in which it is partially extended and a transport position in which it is fully extended;
    a wheel axle assembly pivotally connected to the lower end of said vertically oriented elongated support;
    wheels journaled on said axle assembly wherein said wheel axle assembly includes an axle for journaling at least one wheel, said axle assembly being pivotally connected to the vertically oriented elongated support which is vertically displaceable relative to said wing frame section;

a locking assembly for selectively locking said wheel axle assembly in place when said vertically oriented elongated support is in a field position, said locking mechanism being disengageable when said wing section is in a transport position; and wherein said wheel support assembly further comprising a bar having a U-shaped section and displaceable between a position in which the U-shaped section is free of said axle assembly for permitting pivoting movement and a second position in which the U-shaped section embraces and prevents pivoting movement.

12. The wheel assembly support of claim 11, in which the bar has a stop limiting displacement relative to the said at least one winged section frame to cause the U-shaped section to be free of the wheel axle assembly upon elevating the wing frame section to a transport position.

13. The wheel assembly support of claim 12, wherein said bar extends through and is displaceable vertically relative to said at least one wing frame section with said vertically oriented elongated support.

14. The wheel assembly support of claim 13, wherein the bar has a cap limiting the extent to which the bar extends from said at least one wing frame section.

15. The wheel assembly support of claim 14, further comprising a spring acting on the wing frame section and urging the bar in a direction to cause the U-shaped section to embrace the wheel axle assembly.

16. The wheel assembly of claim 11, wherein the U-shaped section has flared side edges to assist engagement.

\* \* \* \* \*